Patented Jan. 4, 1927.

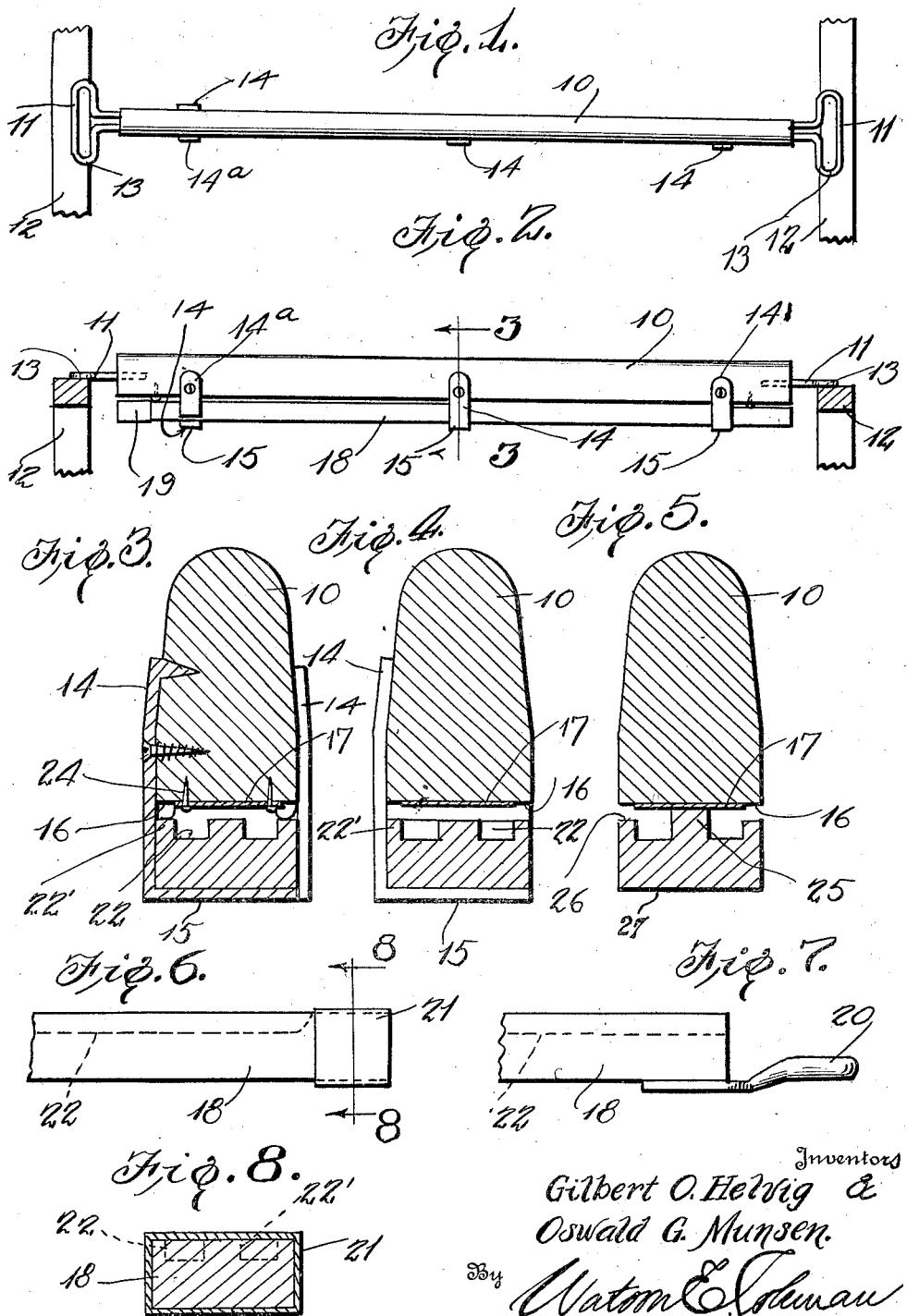

1,613,227

UNITED STATES PATENT OFFICE.

GILBERT O. HELVIG, OF DAWSON, AND OSWALD G. MUNSEN, OF MONTEVIDEO, MINNESOTA.

VERMIN TRAP.

Application filed August 31, 1926. Serial No. 132,874.

This invention relates to vermin traps and more particularly to a device of this character employed in combination with a chicken roost.

An important object of the invention is to provide a device of this character which may be readily cleansed and is readily attached to and removed from the roost without danger of having mites collect upon the hands.

A further and more specific object of the invention is to provide a device of this character which may be applied to and removed from the roost without removing the roost from its support.

The invention further resides in the construction of the roost to permit application of the trap thereto.

These and other objects we attain by the construction shown in the accompanying drawings, wherein for the purpose of illustration is shown a preferred embodiment of our invention and wherein:—

Figure 1 is a plan view of a roost embodying a trap constructed in accordance with our invention;

Figure 2 is a side elevation thereof;

Figure 3 is an enlarged section on the line 3—3 of Figure 2;

Figure 4 is a section similar to that shown in Figure 3, but illustrating the use of strips to provide the spacing;

Figure 5 is a further section illustrating the use of an extension of the medial rib to provide the spacing;

Figure 6 is a fragmentary end view of the trap showing one manner of providing a handle;

Figure 7 is a view showing a second method of providing the handle;

Figure 8 is a section on the line 8—8 of Figure 6.

Referring now more particularly to the drawings, the numeral 10 indicates a roost having at its ends supports 11 for engagement with a roost supporting standard 12. These supports 11 are preferably in the form of staples, such as illustrated in Figure 2, having relatively wide heads 13 for engagement with the roost supporting standard 12 at points spaced from the ends of the roost, so that mites will not pass from the roost to the standard. These broad heads further serve to provide an efficient support for the roost to prevent the same from wobbling. Any suitable similar structure can, of course, be employed. Secured at spaced intervals along one side face of the roost are brackets 14, each including a horizontally directed arm 15 confronting the bottom face of the roost in spaced relation thereto. The under surface of the roost, with the exception of marginal areas 16, is treated or constructed to prevent the collection of mites thereon. This treating consists in applying to the bottom of the roost a covering 17 of less width than the roost, so that the marginal portions 16 are provided and consists of a material repulsive to the mites. This may be either metal, shellac, or varnish or anything else providing a glazed surface upon which it is difficult for the mite to cling or in a coating of a mite repellent liquid of any suitable character.

The trap 18 is substantially co-extensive with the roost and is provided at one end with a handle 19 upon which the mites will not collect. This handle may consist of an actual metal handle, as illustrated at 20 in Figure 7, or in a coating 21 of material upon which the mites will not collect. The upper surface of the trap is formed with longitudinally extending grooves 22 and is free from any transversely extending grooves. Means are provided for maintaining the confronting surfaces of the trap and roost in slightly spaced relation so as to provide a crevice into which the mites may crawl. These means may consist of strips 22' applied to one of said confronting surfaces or of tacks 24 having their shanks embedded in one of said members and their heads providing the spacing elements or of an extension of the rib 25 formed between the grooves 22 of the trap at opposite sides of the center thereof above the upper face 26 of the trap. The arms 15 of the brackets engage beneath the bottom faces 27 of the trap and maintain the upper surface thereof in proper relation to the under surface of the roost.

It will be obvious that where a trap and roost of this sort are formed from a material, such as red-wood, which does not crack or split and thus provide crevices into which the mites may crawl, the mites, leaving the fowls in the morning, will pass downwardly over the outer face of the roost and enter the crevices formed between adjacent faces of the roost and trap. After crossing the marginal portions 16, which might be termed mite paths and coming in contact with the repellent surface 17, they will leave the roost and drop to the trap where they will collect within the grooves 22. During the day, the traps can be removed by grasping the handles 19 thereof and shifting the traps to one side without disturbing the roost. Boiling water or any other suitable destructive agent can then be poured in the grooves, the trap preferably being held inclined, so that this agent will travel longitudinally of the grooves and kill all mites contained therein. This operation will require but little time and will not necessitate removal of all of the roosts, as in the ordinary construction, where the trap forms the support for the roost. In order that the trap may be securely held in position beneath the roost, three brackets 14 are preferably provided, two of these brackets being secured to one side of the roost, while the third bracket is secured to the opposite side thereof. Opposite this third bracket, a latch 14ª is pivoted to the roost, to engage the opposite face of the trap from that which engages the vertical member of the associated bracket.

It will also be obvious that the construction hereinbefore set forth is capable of a certain range of change and modification without materially departing from the spirit of the invention and we accordingly do not limit ourselves to such specific structure except as hereinafter claimed.

We claim:—

1. In combination with a fowl roost having means at its ends for engagement with supporting standards whereby it may be supported, a trap arranged beneath said roost comprising a bar provided in its upper face with longitudinally extending grooves, means maintaining the bar in position beneath the roost and permitting disengagement of the bar therefrom by movement of the bar in a horizontal plane, means maintaining adjacent faces of the bar and trap in slightly spaced relation and a mite repellent substance applied to the under surface of the roost and of less width than the under surface of the roost, said substance in application to the roost providing at opposite side edges of the bottom face of the roost paths permitting mites to enter between adjacent faces of the roost and trap.

2. In combination with a fowl roost having means at its ends for engagement with supporting standards whereby it may be supported, a trap arranged beneath said roost comprising a bar provided in its upper face with longitudinally extending grooves, means maintaining the bar in position beneath the roost and permitting disengagement of the bar therefrom by movement of the bar in a horizontal plane, means maintaining adjacent faces of the bar and trap in slightly spaced relation and a mite repellent substance applied to the under surface of the roost, said substance in application to the roost providing at opposite side edges of the bottom face of the roost paths permitting mites to enter between adjacent faces of the roost and trap, one end of the trap being provided with a mite repellent handle.

3. In combination with a fowl roost having means at its ends for engagement with supporting standards whereby it may be supported, a trap arranged beneath said roost, means supporting the trap beneath the roost comprising L-shaped brackets each having the vertical arm thereof secured to the roost and the horizontal arm thereof opposing the bottom of the roost in spaced relation thereto, one of said brackets being arranged at the opposite side of the roost from the remainder of the brackets and a latch pivoted to the roost opposite said bracket and adapted to engage the opposite side face of the trap to maintain the trap in position upon the roost.

GILBERT O. HELVIG.
OSWALD G. MUNSEN.